(12) United States Patent
Zimmermann

(10) Patent No.: US 8,241,020 B2
(45) Date of Patent: Aug. 14, 2012

(54) PISTON PUMP

(75) Inventor: Marc Zimmermann, Oberstenfeld (DE)

(73) Assignee: Robert Bosch GmbH, Stuttgart (DE)

( * ) Notice: Subject to any disclaimer, the term of this patent is extended or adjusted under 35 U.S.C. 154(b) by 559 days.

(21) Appl. No.: 12/513,433

(22) PCT Filed: Oct. 2, 2007

(86) PCT No.: PCT/EP2007/060429
§ 371 (c)(1),
(2), (4) Date: May 4, 2009

(87) PCT Pub. No.: WO2008/052856
PCT Pub. Date: May 8, 2008

(65) Prior Publication Data
US 2010/0098567 A1 Apr. 22, 2010

(30) Foreign Application Priority Data
Nov. 2, 2006 (DE) .................. 10 2006 051 589

(51) Int. Cl.
*F04B 53/02* (2006.01)
*F04B 53/14* (2006.01)

(52) U.S. Cl. ......... 417/545; 417/546; 417/548; 417/549

(58) Field of Classification Search .................. 417/545, 417/546, 548, 549
See application file for complete search history.

(56) References Cited

U.S. PATENT DOCUMENTS

| | | |
|---|---|---|
| 6,224,352 B1 | 5/2001 | Hauser et al. |
| 6,341,950 B1 * | 1/2002 | Schuller et al. ............... 417/554 |
| 6,652,245 B2 * | 11/2003 | Hauser et al. ................. 417/313 |
| 2005/0063846 A1 | 3/2005 | Maeda |
| 2006/0013702 A1 | 1/2006 | Dinkel et al. |
| 2006/0177326 A1 | 8/2006 | Harada et al. |

FOREIGN PATENT DOCUMENTS

| | | |
|---|---|---|
| DE | 202005002954 U1 | 5/2005 |
| DE | 102004044967 A1 | 6/2005 |
| DE | 102006000054 A1 | 8/2006 |
| WO | 9906698 A1 | 2/1999 |
| WO | 2004037624 A1 | 5/2004 |
| WO | 2006013142 A1 | 2/2006 |

* cited by examiner

*Primary Examiner* — Joseph L Williams
*Assistant Examiner* — Nathaniel Lee

(57) ABSTRACT

The present invention relates to a piston pump. A piston with at least one transverse bore and a longitudinal blind bore, has a plate element with an opening, arranged on the piston at an opening of the longitudinal blind bore. The invention includes an inlet valve, an outlet valve, and a pressure chamber arranged between the inlet valve and the outlet valve. The inlet valve has a pretensioning element, a closing element, and a sealing seat, which sealing seat is built on the plate element.

11 Claims, 2 Drawing Sheets

PISTON PUMP

CROSS-REFERENCE TO RELATED APPLICATION

This application is a 35 USC 371 application of PCT/EP 2007/060429 filed on Oct. 2, 2007.

BACKGROUND OF THE INVENTION

1. Field of the Invention

The present invention relates to a piston pump for delivering a fluid, with an improved construction, the piston pump being used in particular in vehicle brake systems.

2. Description of the Prior Art

Piston pumps in various embodiments are known from the prior art. Known piston pumps are used for instance in vehicle brake systems that make an active pressure buildup possible as a function of predetermined driving situations. Such systems are, for example, ABS, ESP or TC systems. The response performance and pressure buildup of such piston pumps must be quite good, to allow a regulating intervention into the brake system to be made as quickly as possible.

Piston pumps are also used in brake systems as so-called parking brakes (hand brakes). By the use of such piston pumps in vehicles, demands arise with regard to economical production as well as the smallest possible amount of space required. The known piston pumps, however, are relatively expensive to produce and require a relatively large amount of space. Often, the known piston pumps also use a stepped piston, to enable them to be used as a suction pump. For such stepped pistons, however, a very complicated and expensive plunge grinding operation is necessary.

ADVANTAGES AND SUMMARY OF THE INVENTION

The piston pump of the invention has the advantage over the prior art that it is constructed very simply. As a result, it can be produced especially economically, since in particular it has individual components that are easy to produce. Moreover, the piston pump according to the invention can have a very short suction region, making improved suction performance possible. The piston pump of the invention may have the function of a stepped piston without requiring that the piston be produced in a complicated way, in particular by means of a plunge grinding operation. This is attained according to the invention in that the piston pump of the invention has a piston with at least one transverse bore and one longitudinal blind bore as well as a plate element with an opening. The plate element is disposed on the piston at an orifice of the longitudinal blind bore to a pressure chamber of the piston pump. The piston pump furthermore includes an inlet valve and an outlet valve, and the pressure chamber is disposed between the inlet valve and the outlet valve. A sealing seat of the inlet valve is formed on the plate element. Thus the inlet valve is disposed directly on the plate element, and a closing element of the inlet valve closes and opens the opening of the plate element.

Preferably, the inlet valve includes a retainer, for retaining the prestressing element of the inlet valve. As a result, an especially compact inlet valve can be furnished.

The retainer of the inlet valve further preferably includes a seal, which provides sealing at a cylinder of the pressure chamber and at the plate element. The seal seals at the plate element in the axial direction of the piston.

An especially simple construction is obtained if the retainer of the inlet valve is preferably fixed on the plate element. The plate element is preferably embodied as a disk, in particular with a circular circumference.

In a further preferred feature of the invention, the plate element has an integrally formed annular collar, which embraces an end region, toward the pressure chamber, of the piston. As a result, especially easy securing of the plate element to the piston can be attained. The plate element is especially preferably fixed on the piston by nonpositive engagement. This can be effected for instance by means of a press fit between the piston and the annular collar, or by welding or adhesive bonding. It should be noted that alternatively, the plate element rests only loosely on the piston. The result is independence from tolerances, as a result of which, in particular, the production costs can be reduced still further.

Especially preferable, simple assembly is obtained if the plate element is disposed loosely on the piston.

To enable the simplest and most economical possible production, the plate element is a stamped part or a punched part or a cold-formed part. If the stamped part includes the annular collar, the plate element is preferably produced as a deep-drawn part. Alternatively, the plate element may also be made by metal-cutting machining.

The retainer of the inlet valve preferably includes a cage for retaining an inlet valve prestressing element.

Also preferably, an outer diameter of the plate element is greater than an outer diameter of the piston. As a result, the function of a stepped piston can be achieved in particular, yet a complicated and expensive plunge grinding operation, as required for a stepped piston, can be dispensed with. Because of the different diameters, purposeful pressure boosting can furthermore be effected.

BRIEF DESCRIPTION OF THE DRAWINGS

Preferred exemplary embodiments of the invention are described below in conjunction with the drawings. In the drawings.

DESCRIPTION OF THE PREFERRED EMBODIMENTS

Figure 1:
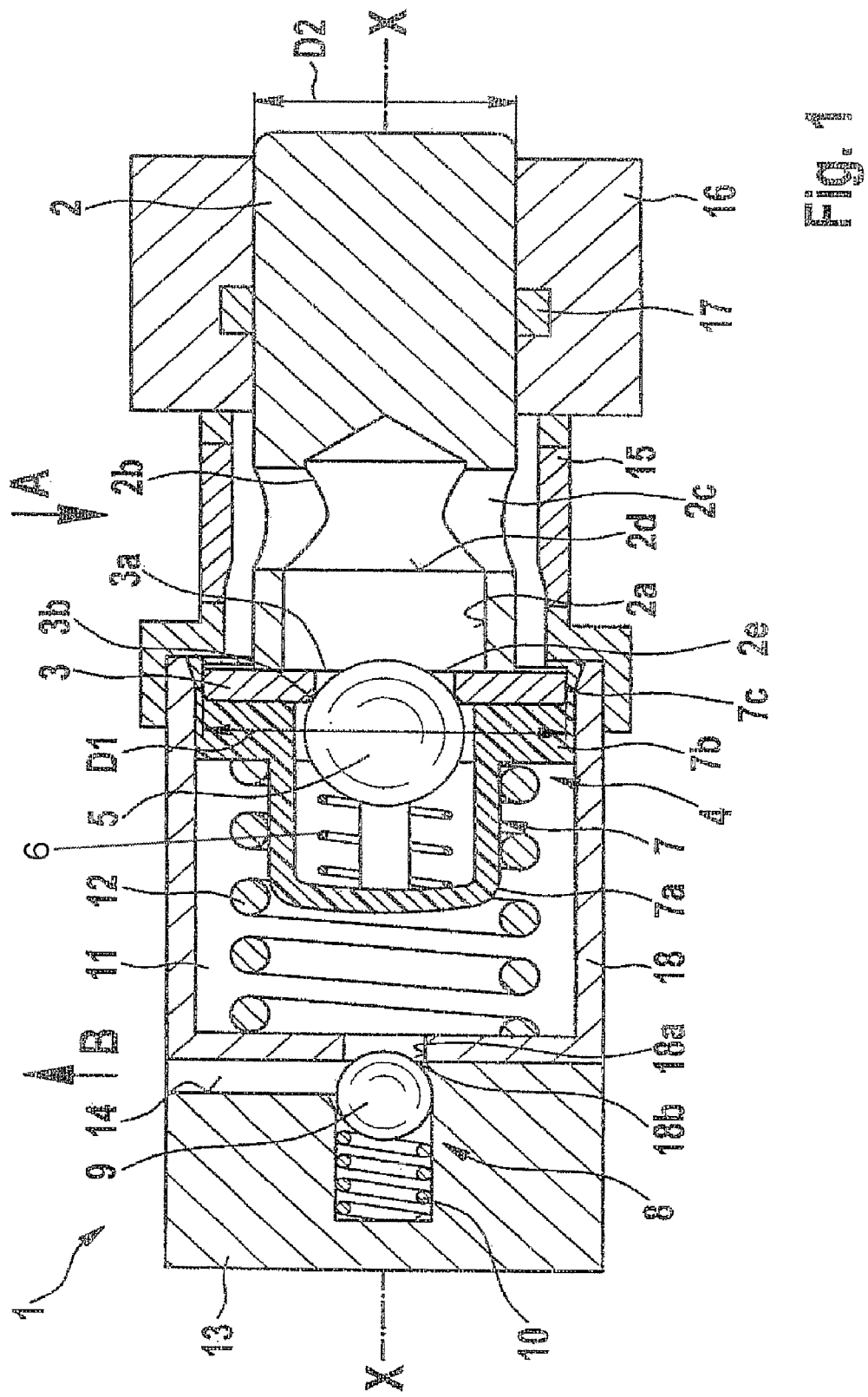
FIG. 1 is a schematic sectional view through a piston pump in a first exemplary embodiment of the present invention.

Below, in conjunction with FIG. 1, a piston pump 1 in a first exemplary embodiment of the invention will be described in detail.

The piston pump 1 includes a cylindrical piston 2, which is made in one piece from a cylindrical roll. The piston 2 includes a longitudinal blind bore 2a as well as a plurality of transverse bores 2b, 2c, 2d. In this exemplary embodiment, four transverse bores are provided, although in the sectional view of FIG. 1 only three bores are visible. An orifice 2e of the longitudinal blind bore 2a is disposed at the end, toward the pressure chamber, of the piston 2. The piston pump 1 furthermore includes a plate element 3, which is disposed on the end, toward the pressure chamber, of the piston 2. The plate element 3 is a flat, disklike, annular plate with a through bore 3a. An inlet valve 4 is disposed on the plate element 3. The piston pump 1 furthermore includes an outlet valve 8 and a pressure chamber 11 that is disposed between the inlet valve 4 and the outlet valve 8.

The inlet valve 4 includes a closing element 5, which in this exemplary embodiment is a ball, and a prestressing spring.

The prestressing spring is braced against a retainer 7. The retainer 7 includes a cage 7a and a sealing region 7b. An extension 7c is also provided on the sealing region 7b and embraces the plate element 3 in the radial direction of the plate element. The retainer 7 is made from a plastic material, and the cage 7a is formed essentially by four arms located parallel to the axial direction X-X of the piston pump, between which arms fluid can flow through when the inlet valve 4 is opened. The cage 7a is thus formed essentially in cup-shaped fashion with flowthrough regions, and the prestressing spring is braced on the inner region of the cup bottom. A restoring spring 12 for restoring the piston 2 is also provided in the pressure chamber 11. As shown in FIG. 1, the restoring spring 12 engages the retainer 7, or more precisely the sealing region 7b of the retainer 7. The piston 2 is driven for instance by an eccentric element (not shown) and moves linearly in the axial direction X-X. The restoring spring 12 is braced on a cylindrical component 18, which at the same time forms a boundary of the pressure chamber 11. The cylindrical component 18 is cup-shaped, with a through opening 18a in the bottom which opening is closed by means of the outlet valve 8. The outlet valve 8 includes a closing element 9 in the form of a ball and a prestressing spring 10 for prestressing the closing element 9 against a sealing seat 18b formed at the outlet of the through opening 18a. The restoring spring 12 is received in a recess formed in a cap 13 of the piston pump. An outlet conduit extending through the cap 13 is indicated by reference numeral 14. A filter 15 for filtering aspirated fluid is disposed radially from the piston 2. The piston 2 itself is guided in a housing 16 and is sealed off from the piston drive by means of a sealing ring 17.

The function of the piston pump of the invention is as follows: Fluid is aspirated through the filter 15 in the direction of the arrow A radially through the transverse bores 2b, 2c, 2d and the longitudinal blind bore into the pressure chamber 11 when the inlet valve 4 is open. In the aspiration phase, the piston 2 moves to the right in terms of FIG. 1, and the restoring spring 12 in particular exerts a corresponding force on the piston 2, via the retainer 7 and the plate element 3. At bottom dead center, the direction of motion of the piston 2 is reversed, and the pressure buildup phase of the piston pump begins. In it, the inlet valve 4 is closed and the outlet valve 8 is likewise still closed. This state is shown in FIG. 1. The piston 2 is moved in the direction of the outlet valve 8, counter to the spring force 12, whereupon pressure is built up in the pressure chamber 11. The outlet valve 8 remains closed until such time as a pressure in the pressure chamber 11 is greater than a counterpressure prevailing in the outlet conduit 14 and than a spring force of the prestressing spring 10 of the outlet valve 8. Once this opening pressure for the outlet valve 8 is reached in the pressure chamber 11, the outlet valve opens, so that fluid under pressure can be carried into the outlet conduit 14 and from there in the direction of the arrow B to further consumers, such as wheel brakes.

As can be seen from FIG. 1, the piston pump 1 of the invention has a very compact construction that is especially short in the axial direction X-X. The plate element 3 is fixed to the piston 2, for instance by means of adhesive bonding. The plate element 3 can be produced simply, for instance as a punched part or a cold-formed part. A valve seat 3b of the inlet valve 4 is formed on the plate element 3. The plate element 3 is especially preferably made from steel or a lightweight metal. It should further be noted that the plate element 3 can alternatively be placed resting loosely on the end, toward the pressure chamber, of the piston 2. This is possible since the region between the plate element 3 and the piston 2 need not perform any sealing function, since the same aspiration pressure prevails both in the piston interior and the piston exterior.

The piston 2 itself may be produced from a simple roll. Since the plate element 3 has a diameter D1 that is greater than a diameter D2 of the piston 2, the piston pump 1 of the invention can take on the function of a stepped pump without the piston itself being embodied as a stepped piston. As a result, in particular, an expensive plunge grinding operation on the piston can be dispensed with. Since furthermore the longitudinal blind bore 2a in the piston 2 has a very large diameter, and the orifice 2e is disposed close to the transverse bores 2b, 2c, 2d, improved aspiration performance of the piston pump 1 can furthermore be attained.

Figure 2:
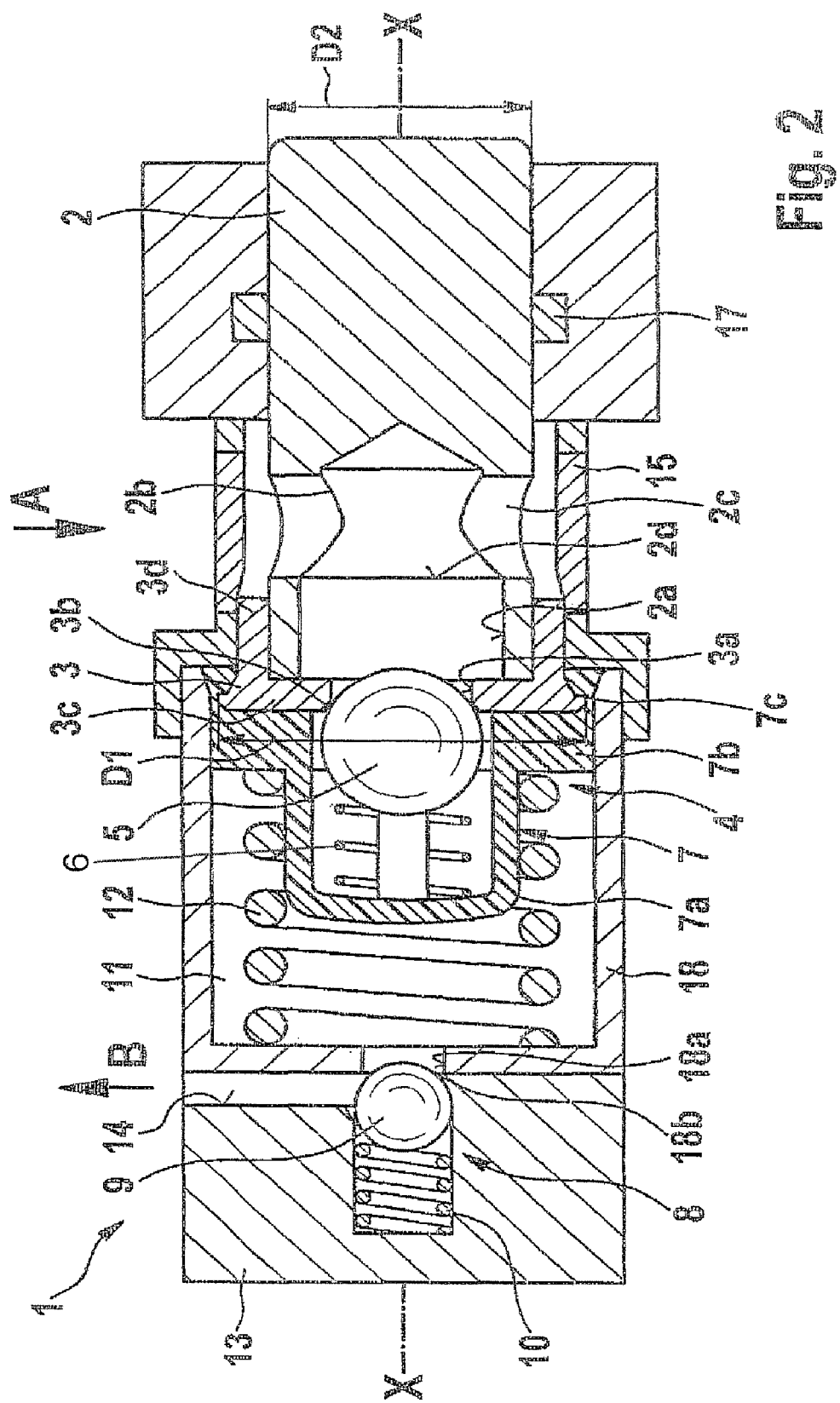
FIG. 2 is a schematic sectional view through a piston pump in a second exemplary embodiment of the present invention.

Below, in conjunction with FIG. 2, a piston pump in a second exemplary embodiment of the invention will be described. Elements that are the same or are functionally the same are identified by the same reference numerals as in the first exemplary embodiment.

The second exemplary embodiment is essentially equivalent to the first exemplary embodiment, but differently from the first exemplary embodiment, the plate element 3 is modified. As shown in FIG. 2, the plate element 3 of the second exemplary embodiment is a substantially cup-shaped element with a disklike bottom region 3c and an annular collar 3d. In the bottom region 3c, as in the first exemplary embodiment, a through bore 3a and a valve seat 3b for the inlet valve 4 are formed. The plate element 3 of the second exemplary embodiment is made from metal and is preferably produced as a deep-drawn part. As a result, the annular collar 3d is easy to produce.

The plate element 3 is fixed on the piston 2 by means of a press fit. The annular collar 3d retains the plate element 3 on the end, toward the pressure chamber, of the piston 2. A diameter D1 of the plate element 3 is greater than a diameter D2 of the piston 2. As a result, an effect of a stepped piston is achieved, in which the piston 2 itself can be provided as a cylindrical piston of constant diameter. A sealing region 7b of the retainer 7 again embraces the plate element 3 by means of the annular extension 7c. Otherwise, this exemplary embodiment is equivalent to the first exemplary embodiment, so that the description of the first embodiment can be referred to.

The foregoing relates to the preferred exemplary embodiments of the invention, it being understood that other variants and embodiments thereof are possible within the spirit and scope of the invention, the latter being defined by the appended claims.

The invention claimed is:

1. A piston pump, comprising:
   a piston having at least one transverse bore and one longitudinal blind bore;
   a plate element having an opening, the plate element being disposed on the piston at an orifice of the longitudinal blind bore;
   an inlet valve;
   an outlet valve; and
   a pressure chamber disposed between the inlet valve and the outlet valve, wherein the inlet valve includes a prestressing element, a closing element, and a sealing seat being formed on the plate element,
   wherein the inlet valve includes a retainer which retains the prestressing element of the inlet valve,
   wherein the retainer includes a sealing region which provides sealing at a cylinder and at the plate element,
   wherein the plate element includes a disk-like bottom region and an integrally formed annular collar which embraces an end of the piston toward the pressure chamber, and wherein the retaining device includes an annular extension which embraces the plate element, and the retaining device is fixed on the plate element.

2. The piston pump as defined by claim 1, wherein the retainer is fixed on the plate element.

3. The piston pump as defined by claim 1, wherein the plate element is a disk.

4. The piston pump as defined by claim 1, wherein the plate element is fixed on the piston by nonpositive engagement in particular by means of a press fit or by means of welding or by means of adhesive bonding.

5. The piston pump as defined by claim 1, wherein the plate element is disposed loosely on the piston.

6. The piston pump as defined by claim 1, wherein the plate element is a stamped part or a punched part or a cold-formed part.

7. The piston pump as defined by claim 1, wherein the plate element with the annular collar is a deep-drawn part.

8. The piston pump as defined by claim 1, wherein the retainer includes a cage for retaining the prestressing element of the inlet valve.

9. The piston pump as defined by claim 1, wherein an outer diameter of the plate element is greater than an outer diameter of the piston.

10. The piston pump as defined by claim 1, wherein the piston has a constant diameter.

11. The piston pump as defined by claim 1, wherein the plate element is fixed on the piston by a press fit, by welding, or by adhesive bonding.

* * * * *